United States Patent
Luo et al.

(10) Patent No.: US 12,446,095 B2
(45) Date of Patent: Oct. 14, 2025

(54) METHOD PERFORMED BY USER EQUIPMENT, USER EQUIPMENT, AND BASE STATION TO DETERMINE HARQ-ACK CODEBOOKS FOR SIDELINK AND DOWNLINK TRANSMISSIONS

(71) Applicant: Sharp Kabushiki Kaisha, Sakai (JP)

(72) Inventors: Chao Luo, Shanghai (CN); Renmao Liu, Shanghai (CN); Yinan Zhao, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 405 days.

(21) Appl. No.: 18/017,434

(22) PCT Filed: Jul. 22, 2021

(86) PCT No.: PCT/CN2021/107846
§ 371 (c)(1),
(2) Date: Jan. 23, 2023

(87) PCT Pub. No.: WO2022/022377
PCT Pub. Date: Feb. 3, 2022

(65) Prior Publication Data
US 2023/0309177 A1    Sep. 28, 2023

(30) Foreign Application Priority Data
Jul. 28, 2020 (CN) .......................... 202010741264.8

(51) Int. Cl.
*H04W 76/20* (2018.01)
*H04L 1/1812* (2023.01)
*H04L 1/1829* (2023.01)

(52) U.S. Cl.
CPC ........... *H04W 76/20* (2018.02); *H04L 1/1812* (2013.01); *H04L 1/1861* (2013.01)

(58) Field of Classification Search
CPC .... H04W 76/20; H04L 1/1812; H04L 1/1861; H04L 1/1819; H04L 1/1822;
(Continued)

(56) References Cited

U.S. PATENT DOCUMENTS

2020/0358562 A1* 11/2020 Peng ................. H04W 72/0446
2022/0264614 A1*  8/2022 Yu ......................... H04L 1/1825
(Continued)

FOREIGN PATENT DOCUMENTS

| AU | 2019210776 A1 | 7/2020 |
| WO | 2019144932 A1 | 8/2019 |

OTHER PUBLICATIONS

Ericsson, "Resource Allocation Mode 1 for NR SL", 3GPP TSG RAN WG1 #100bis-e, R1-2002233, Apr. 20-30, 2020, 18 pages.
(Continued)

*Primary Examiner* — Liem H. Nguyen
(74) *Attorney, Agent, or Firm* — Keating & Bennett, LLP

(57) ABSTRACT

According to the present invention, provided are a method performed by user equipment and user equipment. The method includes: acquiring configuration information related to a hybrid automatic repeat request acknowledgement (HARQ-ACK) codebook, the configuration information including a first HARQ-ACK codebook parameter, a second HARQ-ACK codebook parameter, and a third HARQ-ACK codebook parameter; and determining, according to the configuration information related to the HARQ-ACK codebook, a HARQ-ACK codebook type related to sidelink (SL) transmission, wherein if the second HARQ-ACK codebook parameter has been configured, the first HARQ-ACK codebook parameter is applied and the second HARQ-ACK codebook parameter is ignored, and if the third HARQ-ACK codebook parameter has been configured, the first HARQ-ACK codebook parameter is applied and the third HARQ-ACK codebook parameter is ignored.

3 Claims, 1 Drawing Sheet

(58) Field of Classification Search
CPC ... H04L 1/1664; H04L 1/1896; H04L 5/0016; H04L 5/0044; H04L 5/0055; H04L 1/1614; H04L 1/1864
See application file for complete search history.

(56) References Cited

U.S. PATENT DOCUMENTS

| | | | |
|---|---|---|---|
| 2023/0155736 A1* | 5/2023 | Kim | H04L 1/1864 370/329 |
| 2023/0155746 A1* | 5/2023 | Ouchi | H04W 72/232 370/329 |

OTHER PUBLICATIONS

LG Electronics et al., "New WID on 5G V2X with NR sidelink", 3GPP TSG RAN Meeting #83, RP-190766, Mar. 18-21, 2019, 8 pages.
NTT Docomo, Inc., "New WID on New Radio Access Technology", 3GPP TSG RAN Meeting #75, RP-170855, Mar. 6-9, 2017, 12 pages.
Huawei et al., "New WID on 3GPP V2X Phase 2", 3GPP TSG RAN Meeting #75, RP-170798, Mar. 6-9, 2017, 5 pages.
LG Electronics et al., "New WI proposal: Support for V2V services based on LTE sidelink", 3GPP TSG RAN Meeting #70, RP-152293, Dec. 7-10, 2015, 8 pages.

* cited by examiner

METHOD PERFORMED BY USER EQUIPMENT, USER EQUIPMENT, AND BASE STATION TO DETERMINE HARQ-ACK CODEBOOKS FOR SIDELINK AND DOWNLINK TRANSMISSIONS

TECHNICAL FIELD

The present invention relates to a method performed by user equipment, and user equipment.

BACKGROUND

In 5G V2X (see non-patent document 4), in resource allocation mode 1, UE may report HARQ-ACK information related to SL transmission by means of an uplink resource (e.g., a PUCCH resource). How to determine a HARQ-ACK codebook corresponding to the HARQ-ACK information is a problem that needs to be solved.

PRIOR ART DOCUMENTS

Non-Patent Documents

Non-Patent Document 1: RP-152293, New WI proposal: Support for V2V services based on LTE sidelink
Non-Patent Document 2: RP-170798, New WID on 3GPP V2X Phase 2
Non-Patent Document 3: RP-170855, New WID on New Radio Access Technology
Non-Patent Document 4: RP-190766, New WID on 5G V2X with NR sidelink

SUMMARY

To address at least part of the above problem, provided in the present invention are a method performed by user equipment and user equipment. In the present invention, a HARQ-ACK codebook related to SL transmission is determined appropriately according to configuration information related to the HARQ-ACK codebook, so that the same set of parameters related to HARQ-ACK codebooks can be used to determine both a HARQ-ACK codebook related to DL transmission and a HARQ-ACK codebook related to SL transmission, thereby improving the efficiency of system parameter configuration.

According to the present invention, provided is a method performed by user equipment, comprising: acquiring configuration information related to a hybrid automatic repeat request acknowledgement (HARQ-ACK) codebook, the configuration information comprising a first HARQ-ACK codebook parameter (pdsch-HARQ-ACK-Codebook), a second HARQ-ACK codebook parameter (pdsch-HARQ-ACK-Codebook-r16), and a third HARQ-ACK codebook parameter (pdsch-HARQ-ACK-CodebookList-r16); and determining, according to the configuration information related to the HARQ-ACK codebook, a HARQ-ACK codebook type related to sidelink (SL) transmission, wherein if the second HARQ-ACK codebook parameter has been configured, the first HARQ-ACK codebook parameter is applied and the second HARQ-ACK codebook parameter is ignored, and if the third HARQ-ACK codebook parameter has been configured, the first HARQ-ACK codebook parameter is applied and the third HARQ-ACK codebook parameter is ignored.

In addition, according to the present invention, provided is user equipment, comprising: a processor; and a memory storing instructions, wherein when run by the processor, the instructions perform the aforementioned method.

Therefore, provided in the present invention is a method, which determines a HARQ-ACK codebook related to SL transmission appropriately according to configuration information related to the HARQ-ACK codebook, so that the same set of parameters related to HARQ-ACK codebooks can be used to determine both a HARQ-ACK codebook related to DL transmission and a HARQ-ACK codebook related to SL transmission, thereby improving the efficiency of system parameter configuration.

BRIEF DESCRIPTION OF THE DRAWINGS

The above and other features of the present invention will be more apparent from the following detailed description in combination with the accompanying drawings.

DETAILED DESCRIPTION

Figure 1:
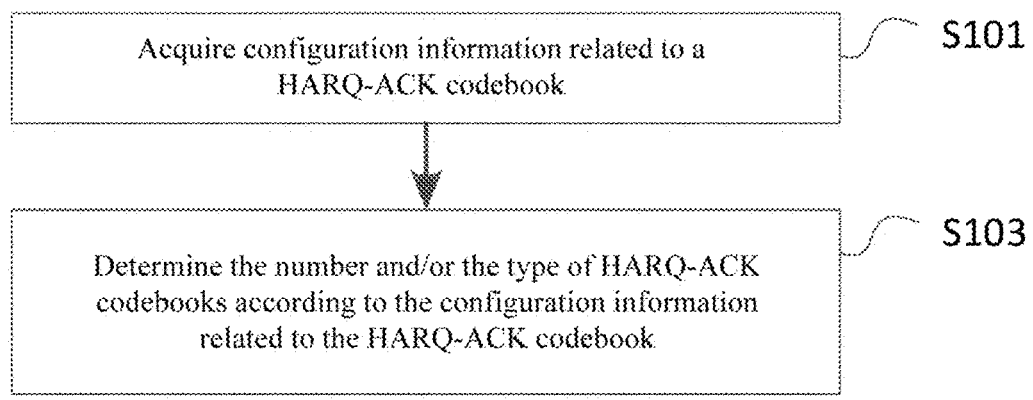
FIG. 1 is a flowchart showing a method performed by user equipment according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following embodiments, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
AGC: Automatic Gain Control
AL: Aggregation Level
AMF: Access and Mobility Management Function
AS: Access Stratum
BWP: Bandwidth Part
CA: Carrier Aggregation
CBR: Channel Busy Ratio
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: also referred to as DMRS, Demodulation Reference Signal
eMBB: Enhanced Mobile Broadband, (enhanced mobile broadband communication)
eNB: E-UTRAN Node B
E-UTRAN: Evolved UMTS Terrestrial Radio Access Network
FDD: Frequency Division Duplex
FDRA: Frequency Domain Resource Assignment
FR1: Frequency Range 1
FR2: Frequency Range 2
GLONASS: GLObal NAvigation Satellite System
gNB: NR Node B
GNSS: Global Navigation Satellite System
GPS: Global Positioning System
HARQ: Hybrid Automatic Repeat Request
HARQ-ACK: HARQ Acknowledgement
ID: Identity (or Identifier)
IE: Information Element
IP: Internet Protocol
LCID: Logical Channel ID, Logical Channel Identifier
LSB: Least Significant Bit
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-Vehicle to Everything
MIB-V2X: Master Information Block-Vehicle to Everything
MME: Mobility Management Entity
MSB: Most Significant Bit
mMTC: massive Machine Type Communication
NAS: Non-Access Stratum
NDI: New Data Indicator
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol.
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSS-SL: Primary Synchronization Signal for Sidelink
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
QoS: Quality of Service
QZSS: Quasi-Zenith Satellite System
RAR: Random Access Response
RB: Resource Block
RE: Resource Element
REG: Resource-Element Group
RF: Radio Frequency
RLC: Radio Link Control
RNTI: Radio Network Temporary Identifier
RRC: Radio Resource Control
RV: Redundancy Version
S-BWP: Sidelink Bandwidth Part
S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCG: Secondary Cell Group
SCI: Sidelink Control Information
SCS: Subcarrier Spacing
SDAP: Service Data Adaptation Protocol
SFN: System Frame Number
SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SL-SCH: Sidelink Shared Channel
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal
SSS-SL: Secondary Synchronization Signal for Sidelink
SSSB: Sidelink SS/PBCH Block (Sidelink Synchronization Signal/Physical Broadcast Channel Block)
SSSS: Secondary Sidelink Synchronization Signal
STAG: Secondary Timing Advance Group
Sub-channel: Sub-channel
SUL: Supplementary Uplink
S-GW: Serving Gateway
TA: Timing Advance
TAG: Timing Advance Group
TB: Transport Block
TCP: Transmission Control Protocol
TDD: Time Division Duplex
TPC: Transmit Power Control
UE: User Equipment
UL: Uplink
UMTS: Universal Mobile Telecommunications System
UPF: User Plane Function
URLLC: Ultra-Reliable and Low Latency Communication
USS: UE-specific Search Space
V21: Vehicle-to-Infrastructure
V2N: Vehicle-to-Network V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, a parameter z defined in an information element I may also be referred to as a "data unit" (or "field") in the information element I, and correspondingly, an information element Z corresponding to the parameter z may also be referred to as the type of the "data unit" (or "field") z.

Optionally, in the case that the context is clear, a sequence $x(0), x(1), \ldots, x(N-1)$ having N elements may be shortened to $x(0), \ldots, x(N-1)$.

Optionally, the length of a sequence having N elements is N (or, the size is N).

Optionally, "V2X communication", "V2X SL communication", and "SL V2X communication" are interchangeable with each other where applicable.

Optionally, "V2X communication" may be V2X communication based on NR SL where applicable.

Optionally, "V2X communication" may be V2X communication based on LTE SL where applicable.

Optionally, in the case that the context is clear, it may be considered that one DL carrier, one UL carrier, and optionally one SUL carrier may be configured in a TDD cell. The UL carrier may also be referred to as a "non-SUL carrier".

Optionally, in the case that the context is clear, it may be considered that in a TDD cell, a "non-SUL carrier" is a "UL carrier". For example, a TDD cell may be configured with one UL carrier, referred to as "non-SUL carrier". As another example, a TDD cell may be configured with two UL carriers, one of which is a "non-SUL carrier" and the other is a "SUL carrier".

Optionally, "send" and "transmit" are interchangeable with each other where applicable.

Optionally, any two of "within XX", "in XX", and "on XX" are interchangeable with each other where applicable. XX may be one or more carriers (e.g., an SL carrier), or one or more BWPs (e.g., an SL BWP), or one or more resource pools, or one or more links (e.g., a UL, a DL, or an SL), or one or more channels (e.g., a PSSCH), or one or more sub-channels, or one or more RBGs, or one RB, etc.

Optionally, if $S_1$ is a set, then a subset of $S_1$ may be a set of zero or one or a plurality of (including all) elements in $S_1$.

Optionally, if $S_1$ and $S_2$ are two sets, then $S_1$-$S_2$ represents a "difference set" of the set $S_1$ and the set $S_2$, namely a set of elements in the set $S_1$ not belonging to the set $S_2$.

Optionally, if $S_1$ and $S_2$ are two sets, then $S_1-S_2=\{x|x\notin S_1 \text{ and } x\notin S_2\}$.

Optionally, performing operations (such as filtering, transformation, etc.) on elements in the set $S_1$ to acquire a set $S_2$ can be equivalent to directly performing operations on the original set $S_1$ to acquire an updated set $S_1$.

Optionally, "higher layer" may refer to one or more protocol layers or protocol sub-layers above a physical layer. For example, a MAC layer, an RLC layer, a PDCP layer, a PC5 RRC layer, a PC5-S layer, an RRC layer, a V2X layer, an application layer, a V2X application layer, or the like.

Optionally, "pre-configuration" may be pre-configuration performed by means of a higher-layer protocol/signaling. For example, it is pre-configured in a specific storage location in the UE (for example, it is pre-configured according to the specification of the higher layer protocol), or it is pre-configured in a specific accessible storage location in the UE (for example, it is pre-configured according to the specification of the higher layer protocol).

Optionally, "configuration" may be configuration performed by means of a higher layer protocol/signaling. For example, configuration is performed for the UE by means of RRC signaling.

Optionally, "configured" may be replaced with "pre-configured".

Optionally, "configured" may be replaced with "configured or pre-configured".

Optionally, "a certain parameter has been configured" may be replaced with "a certain parameter has been provided".

Optionally, "a certain parameter has been configured" may be replaced with "a certain parameter has been signaled".

Optionally, "not configured" may be replaced with "not pre-configured".

Optionally, "not configured" may be replaced with "not configured and/or not pre-configured".

Optionally, "not configured" may be replaced with "not (pre-)configured".

Optionally, in the case that the context is clear, suffixes such as "-r8", "-r9", "-r10", "-r11", "-r12", "-r13", "-r14", "-r15", "-r16", etc., in parameter names may be removed. For example, "pdsch-HARQ-ACK-CodebookList" may be used to refer to a parameter "pdsch-HARQ-ACK-CodebookList-r16".

Optionally, a time-domain resource may also be referred to as a time resource.

Optionally, a frequency-domain resource may also be referred to as a frequency resource.

Optionally, "symbol" refers to "OFDM symbol".

Optionally, in one slot, OFDM symbol numbers may start from 0. For example, for a normal CP, a set of OFDM symbol numbers in a slot may be $\{0, 1, \ldots, 13\}$. As another example, for an extended CP, a set of OFDM symbol numbers in a slot may be $\{0, 1, \ldots, 11\}$.

Optionally, the resource block may refer to a virtual resource block (VRB), or may refer to a physical resource block (PRB), or may refer to a common resource block (CRB), or may refer to a resource block defined in another manner.

Optionally, subchannel (or sub-channel) numbers may start from 0. For example, if the number of sub-channels configured in the resource pool is $N_{subChannel}^{SL}$, then a set of sub-channel numbers may be $\{0, 1, \ldots, N_{subChannel}^{SL}-1\}$.

Optionally, in one resource block, subcarrier numbers may start from 0. For example, a set of subcarrier numbers in a resource block may be $\{0, 1, \ldots, 11\}$.

Optionally, the value of a parameter (e.g., an RRC parameter) of the size of L bits may be represented by one integer value (e.g., 0, 1, 2, etc.), and may also be represented by a bit string (e.g., a bit string having the length of L, e.g., '$b_0, b_1 \ldots b_{L-1}$') corresponding to the integer, wherein Optionally, in the bit string '$b_0, b_1 \ldots b_{L-1}$', the first (i.e., the leftmost) bit (i.e., $b_0$) is the most significant bit, and the last (i.e., the rightmost) bit (i.e., $b_{L-1}$) is the least significant bit. For example, if L=3, and the value of the parameter is represented by the bit string "011", then the value of the most significant bit of the parameter is 0, and the integer value corresponding to the parameter is 3.

Optionally, in the bit string '$b_0, b_1 \ldots b_{L-1}$', the first (i.e., the leftmost) bit (i.e., $b_0$) is the least significant bit, and the last (i.e., the rightmost) bit (i.e., $b_{L-1}$) is the most significant bit. For example, if L=3, and the value of the parameter is represented by the bit string "011", then the value of the least significant bit of the parameter is 0, and the integer value corresponding to the parameter is 6.

In communication based on device to device (D2D) technology, an interface between devices (also referred to as user equipment (UE)) may be referred to as a PC5 interface. A corresponding transmission link on a physical layer may be referred to as a "direct link" or "sidelink" (SL for short) so as to be distinguished from an uplink (UL for short) and a downlink (DL for short). Communication based on an SL may be referred to as sidelink (SL) communication. An SL based on LTE technology may be referred to as an LTE SL. An SL based on NR technology may be referred to as an NR SL. 5G V2X communication may be based on an LTE SL or an NR SL. Hereinafter, "SL" refers to an NR SL, and "SL communication" refers to NR SL communication unless otherwise specified.

A physical layer of an SL can support transmissions in one or more modes, such as broadcast transmission, groupcast transmission, unicast transmission, and the like, in one or more of in-coverage, out-of-coverage, and partial-coverage scenarios.

For frequency range 1 (FR1), a subcarrier spacing (SCS, denoted as $\Delta f$, in units of kHz) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as μ). For example, $\Delta f$=15 kHz corresponds to μ=0, $\Delta f$=30 kHz corresponds to ρ=1, $\Delta f$=60 kHz corresponds to μ=2, $\Delta f$=120 kHz corresponds to μ=3, and so on. For another example, for any given μ, $\Delta f = 2^\mu \cdot 15$ kHz. μ may be an SCS configuration of an SL carrier. For example, all SL transmissions in one SL carrier use the same SCS configuration and/or the same CP. μ may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. μ may be an SCS configuration of a resource pool. For example, all SL transmissions in one resource pool use the same SCS configuration and/or the same CP.

Signals and channels related to an SL operation may include:
- an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;
- an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;
- a PSBCH (physical sidelink broadcast channel);
- a PSCCH (physical sidelink control channel);
- a PSSCH (physical sidelink shared channel); and
- a PSFCH (physical sidelink feedback channel).

The SL PSS, the SL SSS, and the PSBCH may be organized together into a block on a time/frequency resource. The block is referred to as, for example, an S-SSB (sidelink synchronization signal/PSBCH block, or SSS/PSBCH block), or is referred to as an SSS/PSBCH block, or is referred to as an SS/PSBCH block, or is referred to as an S-SS/PSBCH block, or is referred to as an SL SSB, or is referred to as an SSSB, or is referred to as an SL-SSB, or is referred to as an SSB-SL. A transmission bandwidth (for example, 11 resource blocks) of the S-SSB may be located in a corresponding SL carrier (for example, located in one SL BWP configured in the SL carrier). The SL PSS and/or the SL SSS may carry an SL SSID (sidelink synchronization identity, or sidelink synchronization identifier, or sidelink synchronization signal identity, or sidelink synchronization signal identifier, or referred to as SL-SSID, or referred to as SSID-SL, or referred to as SLSSID, or referred to as SLSS ID, or referred to as S-SSID, or the like), and the PSBCH may carry an SL MIB (sidelink master information block, or referred to as SL-MIB, or referred to as S-MIB, or referred to as MIB-SL, or referred to as MasterInformationBlock-Sidelink), which is configured by means of, for example, a parameter masterInformationBlockSidelink.

On the SL, a time-domain resource and/or a frequency-domain resource used to transmit the S-SSB may be configured by means of higher-layer parameter(s). For example, in the frequency domain, a location of the S-SSB in the frequency domain may be configured by means of a parameter absoluteFrequencySSB-SL (or a parameter sl-AbsoluteFrequencySSB). As another example, in the time domain, one or more synchronization configuration items may be configured by means of a parameter sl-SyncConfigList. In each synchronization configuration item, $N_{period}^{S-SSB}$ S-SSBs within an S-SSB period having a length of 16 frames can be configured by means of a parameter numSSBwithinPeriod-SL (or a parameter sl-NumSSB-WithinPeriod). An index of a slot where an S-SSB having a number (or an index) of $i_{S-SSB}$ ($0 \le i_{S-SSB} \le N_{period}^{S-SSB}-1$ is located in the period having a length of 16 frames may be $N_{offset}^{S-SSB} + N_{interval}^{S-SSB} \cdot i_{S-SSB}$, wherein $N_{offset}^{S-SSB}$ may be configured by means of a parameter timeOffsetSSB-SL (or a parameter sl-TimeOffsetSSB), and $N_{interval}^{S-SSB}$ may be configured by means of a parameter timeIntervalSSB-SL (or a parameter sl-TimeInterval).

Sometimes, it may be considered that the time-domain resource and/or the frequency-domain resource configured for the S-SSB in the SL carrier corresponds to a candidate S-SSB (or referred to as S-SSB candidate). On a time-domain resource and/or a frequency-domain resource corresponding to one candidate S-SSB, one or more S-SSB transmissions (for example, respectively from different UEs) may exist at the same time, or no S-SSB transmission may exist.

Sometimes, a slot configured with an S-SSB (or configured with an S-SSB resource, or configured with a candidate S-SSB, or configured with a candidate S-SSB resource) may also be referred to as a slot configured with an SLSS (or configured with an SLSS resource), and vice versa.

A synchronization source (or referred to as a synchronization reference, or referred to as a synchronization reference source) related to SL synchronization may include a GNSS (global navigation satellite system, a gNB, an eNB, and UE (for example, NR UE, or LTE UE, or NR UE or LTE UE). UE serving as a synchronization source (for example, UE transmitting the S-SSB) may be referred to as SyncRef UE.

Examples of the GNSS may include the GPS (Global Positioning System), the GLONASS (GLObal NAvigation Satellite System), the BeiDou (Beidou Navigation Satellite System), the Galileo (Galileo Navigation Satellite System), the QZSS (Quasi-Zenith Satellite System), etc.

One or more (for example, one) SL BWPs may be configured in the SL carrier. In each SL BWP, a starting symbol that can be used for SL transmission may be configured by means of a parameter startSLsymbols (or a parameter sl-StartSymbol) (for example, the symbol is numbered as $l_{start}^{SL}$ in the slot), and the number of symbols that can be used for SL transmission may be configured by means of a parameter lengthSLsymbols (or a parameter sl-LengthSymbols) (for example, the number of symbols is denoted as $N_{length}^{SL}$). The $N_{length}^{SL}$ symbols may be consecutive symbols. A value set of $l_{start}^{SL}$ may be denoted as $S_{start}^{SL}$, for example $S_{start}^{SL}=\{0, 1, 2, 3, 4, 5, 6, 7\}$, and a value set of $N_{length}^{SL}$ may be denoted as $S_{length}^{SL}$, for example, $S_{length}^{SL}=\{7, 8, 9, 10, 11, 12, 13, 14\}$. The "symbols that can be used for SL transmission" may be referred to as "SL symbols". If a set of SL symbols (in chronological order) is denoted as $$\left\{ l_1^{SL}, l_2^{SL}, \ldots, l_{N_{length}^{SL}}^{SL} \right\},$$

then $$l_1^{SL} = l_{start}^{SL},$$

$$l_2^{SL} = l_{start}^{SL} + 1, \ldots,$$

$$l_{N_{length}^{SL}}^{SL} = l_{start}^{SL} + N_{length}^{SL} - 1.$$

For example, if $l_{start}^{SL}=7$ and $N_{length}^{SL}=7$, then the set of SL symbols is $\{7, 8, 9, 10, 11, 12, 13\}$.

Only a slot meeting a certain condition can be used for SL transmission. For example, at least the symbol $l_{start}^{SL}$, the symbol $l_{start}^{SL}+1, \ldots$, and the symbol $l_{start}^{SL}+N_{length}^{SL}-1$ in the slot (for example, the slot configured by means of tdd-UL-DL-ConfigurationCommon in servingCellConfig-Common in an SIB1 and meeting the condition) are uplink symbols. As another example, the slot needs to be in a slot set of a configured resource pool.

One or more resource pools may be configured in one SL BWP, and in each resource pool,
- in the frequency domain, the location of a starting resource block of a starting sub-channel of the resource pool in the SL BWP may be configured by means of a parameter startRB-Subchannel (or a parameter sl-StartRB-Subchannel).
- In the frequency domain, each sub-channel may consist of one or more resource blocks, and the specific number of resource blocks (referred to as a size of the sub-channel, for example, denoted as $n_{subChannelSize}$) may be configured by means of a parameter subchannelsize (or a parameter sl-SubchannelSize). The $n_{subChannelSize}$ resource blocks may be consecutive in the frequency domain.
- In the frequency domain, the number (denoted as $N_{subChannel}^{SL}$) of sub-channels occupied by the resource pool may be configured by means of a parameter numSubchannel (or a parameter sl-NumSubchan-nel). The $N_{subChannel}^{SL}$ sub-channels may be consecutive in the frequency domain.
- In the frequency domain, the number (denoted as $N_{PRB}^{SL}$) of PRBs occupied by the resource pool may be configured by means of a parameter sl-RB-Number. Optionally, the UE may assume that the last $N_{PRB}^{SL}$ mod $N_{subChannel}^{SL}$ PRBs in the $N_{PRB}^{SL}$ PRBs are not to be used.
- In the frequency domain, in an order from a low frequency to a high frequency, sub-channels in a resource pool may be respectively numbered as $0, 1, \ldots, N_{subChannel}^{SL}-1$. A sub-channel numbered as i may be referred to as "sub-channel i" ($0 \leq i \leq N_{subChannel}^{SL}-1$).
- In the time domain, one or more slots available for the resource pool (or belonging to the resource pool) and recurring periodically may be configured by means of a parameter timeresourcepool (or a parameter sl-TimeResource) (for example, by means of a slot bitmap). The size of the period may be a predefined value, or may be configured by means of a parameter periodResourcePool (or a parameter sl-Period).

Methods for allocating resources (such as time-domain resources, or frequency-domain resources, or code-domain resources) related to an SL operation may be classified as follows:

Mode 1: a base station schedules SL resources for SL transmission.

Mode 2: UE determines SL resources for SL transmission (that is, the base station does not participate in scheduling of the SL resources). For example, UE performing an SL transmission operation autonomously determines the SL resource(s) for an SL transmission.

The UE may schedule data transmission by means of sidelink control information (SCI). The SL operation may support "two-stage SCI." $1^{st}$-stage SCI may include information such as resource reservation and/or resource allocation, so that all UEs monitoring the SL may perform sensing with respect to a resource reservation and/or resource allocation status. $2^{nd}$-stage SCI may include other information, such as information related to HARQ feedback and the like. Hereinafter, unless otherwise specified, when mentioned individually, "SCI" may refer to the $1^{st}$-stage SCI, or the $2^{nd}$-stage SCI, or the $1^{st}$-stage SCI and the $2^{nd}$-stage SCI.

A format of the $1^{st}$-stage SCI may be SCI format 1-A (or written as "SCI format 1_A"). The following are some examples of the information that can be included in the SCI format 1-A:
priority;
frequency resource assignment;
time resource assignment;
a resource reservation period; and
DMRS pattern.
a $2^{nd}$-stage SCI format.

A format of the $2^{nd}$-stage SCI may be SCI format 2-A (or written as "SCI format 2_A") or SCI format 2-B (or written as "SCI format 2_B"). The following are some examples of the information that can be included in the SCI format 2-A and/or SCI format 2-B:
a source layer-1 identifier (source layer-1 ID, or referred to as layer-1 source ID, or referred to as physical layer source ID, or referred to as source ID (when the context is clear));
a destination layer-1 identifier (destination layer-1 ID, or referred to as layer-1 destination ID, or referred to as physical layer destination ID, or referred to as destination ID (when the context is clear));

an HARQ process identifier (HARQ process ID), or an HARQ process number;

a new data indicator (NDI); and a redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for SL transmission (for example, a sub-channel where a starting resource block of the PSCCH is located is a starting sub-channel of the PSSCH associated therewith. For another example, the starting resource block of the PSCCH is a starting resource block of the starting sub-channel of the PSSCH associated therewith). In addition, it may be considered that the $1^{st}$-stage SCI and/or the corresponding $2^{nd}$-stage SCI schedules the PSSCH (or schedules transmission of the PSSCH, or schedules transmission of a TB carried on the PSSCH).

For a particular SL transmission including a PSCCH and/or a PSSCH, a transmitting party may be referred to as TX UE, and a receiving party may be referred to as RX UE. In the case that HARQ feedback is enabled, the RX UE may cause feedback information (e.g., referred to as "HARQ-ACK information") related to PSCCH and/or PSSCH reception to be carried in PSFCH transmission. In some configurations, the HARQ-ACK information may be a positive acknowledgement (ACK) indicating, for example, that data carried by a corresponding PSCCH and/or PSSCH can be correctly decoded, or a negative acknowledgement (NACK or NAK) indicating, for example, that data carried by a corresponding PSCCH and/or PSSCH cannot be correctly decoded. In some other configurations, the HARQ-ACK information may be only an NACK (for example, no HARQ-ACK information is transmitted when data carried by a corresponding PSCCH and/or PSSCH can be correctly decoded, and an NACK is transmitted when data carried by a corresponding PSCCH and/or PSSCH cannot be correctly decoded). HARQ-ACK feedback may be applied to groupcast transmission or unicast transmission.

In the time domain, PSFCH resources may recur periodically in a resource pool. For example, a corresponding period (referred to as, for example, "PSFCH period" or "PSFCH resource period," denoted as, for example, $N_{PSSCH}^{PSFCH}$, and in units of, for example, the number of slots) may be configured by means of a parameter period-PSFCHresource (or a parameter sl-PSFCH-Period) (for example, $N_{PSSCH}^{PSFCH}=1$, or $N_{PSSCH}^{PSFCH}=2$, or $N_{PSSCH}^{PSFCH}=4$). $N_{PSSCH}^{PSFCH}=0$ may be used to indicate that no PSFCH resource is configured in a corresponding resource pool, and/or to indicate that HARQ feedback in the corresponding resource pool is disabled. For example, if a resource pool is not configured with any PSFCH-related parameter (such as a parameter configured by means of sl-PSFCH-Config), or if a PSFCH period configured in the parameter sl-PSFCH-Config is 0, then it is indicated that the resource pool has not been configured with any PSFCH resource. Optionally, if a resource pool has been configured with the parameter sl-PSFCH-Config, and if the PSFCH period configured in the parameter sl-PSFCH-Config is greater than 0 slot, then it is indicated that the resource pool has been configured with PSFCH resources.

In the frequency domain, PSFCH resources may be configured to be in one RB set (for example, a set of consecutive PRBs, or a set of partially or completely inconsecutive PRBs). For example, it is configured by means of a parameter sl-PSFCH-RB-Set.

In resource allocation mode 1, the base station may configure one or more SL configured grants (or referred to as SL grants for short when the context is clear) for the UE by means of, for example, a parameter sl-ConfiguredGrant-ConfigList. Each SL configured grant may be associated with a periodic resource for SL transmission, and for example, a period of the resource may be configured by means of a parameter sl-PeriodCG. The SL configured grants may be divided into SL configured grant type-1 and SL configured grant type-2. Resources associated with SL configured grant type-1 may be configured and/or activated and/or deactivated by means of semi-persistent signaling (e.g., RRC signaling), and resources associated with SL configured grant type-2 may be activated and/or deactivated dynamically (e.g., by means of DCI).

In resource allocation mode 1, the base station may allocate, to the UE, one or more resources for SL transmission by means of DCI (e.g., DCI format 3_0). This resource allocation method may be referred to as "dynamic grant" so as to be distinguished from "configured grant".

In resource allocation mode 1, the base station may instruct the UE to report, on an uplink resource (e.g., a PUCCH resource) that is specified (e.g., indicated in DCI format 3_0), HARQ-ACK information related to SL transmission (e.g., SL transmission scheduled by the same DCI format 3_0). The HARQ-ACK information may be used to feed back information about transmission and/or reception of data and/or control information on the sidelink (e.g., a transmission and/or reception status, or a transmission and/or reception result, or transmission not performed, or reception not performed, etc.). Specifically, the HARQ-ACK information may be from (or based on) one or more of the following:

PSFCH reception or PSFCH receptions.

Absence of PSFCH reception or absence of PSFCH receptions. For example, PSFCH reception cannot be performed in a slot where a PSFCH otherwise needs to be received because another task of a higher priority needs to be performed (such as performing UL transmission having a higher priority). As another example, SCI for scheduling data transmission on a sidelink indicates that the UE receiving the data transmission does not need to transmit HARQ-ACK (e.g., HARQ-ACK carried by the PSFCH). As another example, since DCI (e.g., DCI format 3_0) for scheduling corresponding PSCCH and/or PSSCH transmission is not detected, a PSCCH and/or PSSCH is not transmitted, and correspondingly, no PSFCH is received. As another example, no PSFCH resource is configured in a corresponding resource pool.

PSCCH and/or PSSCH transmission.

TB transmission, for example, a TB carried by a PSSCH.

PSCCH and/or PSSCH reception.

PSFCH transmission.

The UE may be configured to report the HARQ-ACK information according to a type-1 HARQ-ACK codebook or a type-2 HARQ-ACK codebook. The size of the type-1 HARQ-ACK codebook may depend only on semi-persistent configuration information (e.g., configuration information of the RRC layer). The size of the type-2 HARQ-ACK codebook may vary dynamically (e.g., on the basis of the number of detected DCI formats associated with the HARQ-ACK codebook). For example, the numbers of HARQ-ACK information bits in the type-2 HARQ-ACK codebook transmitted in two different PUCCH slots may be different. If PUSCH transmission exists in a slot where the PUCCH resource is located, the UE may multiplex the HARQ-ACK information on the PUSCH transmission.

HARQ-ACK information in the HARQ-ACK codebook may be associated with one or more SL configured grants.

HARQ-ACK information in the HARQ-ACK codebook may be associated with one or more DCI formats (e.g., DCI format 3_0). Each of the one or more DCI formats may be used for one or more purposes related to data and/or control information transmitted on the sidelink, and the one or more purposes include, for example, one or more of the following:

Scheduling PSCCH and/or PSSCH transmission. In this case, optionally, CRC of the DCI format is scrambled by an SL-RNTI or an SL-CS-RNTI.

Indicating activation of a SL configured grant (e.g., SL configured grant type-2).

Indicating release of a SL configured grant (e.g., SL configured grant type-2).

In addition, as a comparison, the UE may also report, on an uplink resource (e.g., a PUCCH or a PUSCH), HARQ-ACK information related to DL transmission (correspondingly, a HARQ-ACK codebook related to the DL transmission is used), so as to feed back information about transmission and/or reception of data and/or control information on the downlink (e.g., a transmission and/or reception status, or a transmission and/or reception result, or transmission not performed, or reception not performed, etc.). Specifically, the HARQ-ACK information may be from (or based on) one or more of the following:

PDSCH reception with corresponding PDCCH reception.

PDSCH reception without corresponding PDCCH reception (e.g., SPS PDSCH reception).

PDCCH reception. For example, the "SPS PDSCH release" indication is indicated in the DCI carried by the PDCCH. As another example, "SCell dormancy" is indicated in the DCI carried by the PDCCH.

In all embodiments and implementations of the present invention, if not otherwise specifically indicated, "HARQ-ACK information" refers to HARQ-ACK information related to SL transmission, and "HARQ-ACK codebook" refers to a HARQ-ACK codebook including HARQ-ACK information related to SL transmission.

Embodiment 1

A method performed by user equipment according to Embodiment 1 of the present invention will be described below with reference to FIG. 1.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, configuration information related to a HARQ-ACK codebook is acquired.

Optionally, the "configuration information related to a HARQ-ACK codebook" may be from a base station (e.g., a gNB or an eNB), or may be from another UE, or may be from the UE.

Optionally, the "configuration information related to a HARQ-ACK codebook" may be predefined.

Optionally, the "configuration information related to a HARQ-ACK codebook" may be pre-configured.

Optionally, the "configuration information related to a HARQ-ACK codebook" may be configured by means of signaling (e.g., signaling between the base station and the UE, or signaling between the UE and another UE).

Optionally, the "configuration information related to a HARQ-ACK codebook" may be included in an RRC message and/or a PC5 RRC message (e.g., MIB, or SIB1, or SIB12, or SIB13, or SIB14, or another SIB, or MasterInformationBlockSidelink, or another RRC message and/or PC5 RRC message).

Optionally, the "configuration information related to a HARQ-ACK codebook" may be included in a MAC CE.

Optionally, the "configuration information related to a HARQ-ACK codebook" may be included in downlink control information (DCI).

Optionally, the "configuration information related to a HARQ-ACK codebook" may be included in sidelink control information (SCI).

Optionally, the "configuration information related to a HARQ-ACK codebook" may include one or more of the following parameters:

pdsch-HARQ-ACK-Codebook, wherein
Optionally, the value of the parameter pdsch-HARQ-ACK-Codebook may be an element in a set A101. The set A101 may be one of the following:
{semiStatic, dynamic}.
{semiStatic, dynamic, enhancedDynamic}.
Optionally, the parameter pdsch-HARQ-ACK-Codebook may be defined in an information element PhysicalCellGroupConfig, e.g.,

```
PhysicalCellGroupConfig ::= SEQUENCE {
    ...
    pdsch-HARQ-ACK-Codebook   ENUMERATED {semiStatic, dynamic},
    ...
}
``` pdsch-HARQ-ACK-Codebook-r16, wherein
Optionally, the value of the parameter pdsch-HARQ-ACK-Codebook-r16 may be an element in a set A102. The set A102 may be one of the following:
{enhancedDynamic}.
{semiStatic, dynamic}.
{semiStatic, dynamic, enhancedDynamic}.
Optionally, the parameter pdsch-HARQ-ACK-Codebook-r16 may be defined in the information element PhysicalCellGroupConfig, e.g.,

```
PhysicalCellGroupConfig ::= SEQUENCE {
    ...
    pdsch-HARQ-ACK-Codebook-r16   ENUMERATED
    {enhancedDynamic}
    OPTIONAL, -- Need R
    ...
}
``` pdsch-HARQ-ACK-CodebookList-r16, wherein
Optionally, the parameter pdsch-HARQ-ACK-CodebookList-r16 may be defined in the information element PhysicalCellGroupConfig, e.g.,

```
PhysicalCellGroupConfig ::= SEQUENCE {
    ...
    pdsch-HARQ-ACK-CodebookList-r16      SetupRelease
    {PDSCH-HARQ-ACK-CodebookList-r16} OPTIONAL, -- Need M
    ...
}
``` wherein
Optionally, the information element PDSCH-HARQ-ACK-CodebookList-r16 may be defined as follows

```
PDSCH-HARQ-ACK-CodebookList-r16 ::= SEQUENCE (SIZE (1..2))
OF
ENUMERATED {semiStatic, dynamic}
```

Optionally, the information element PDSCH-HARQ-ACK-CodebookList-r16 may be defined as follows

```
PDSCH-HARQ-ACK-CodebookList-r16 ::= SEQUENCE (SIZE (1..2))
OF
ENUMERATED {semiStatic, dynamic, enhancedDynamic}
```

Optionally, if the parameter pdsch-HARQ-ACK-Codebook has been configured, then the parameter pdsch-HARQ-ACK-Codebook-r16 is ignored.

Optionally, if the parameter pdsch-HARQ-ACK-Codebook has been configured, then the parameter PDSCH-HARQ-ACK-CodebookList-r16 is ignored.

Optionally, if the parameter pdsch-HARQ-ACK-Codebook-r16 has been configured, then the parameter pdsch-HARQ-ACK-Codebook is ignored.

Optionally, if the parameter pdsch-HARQ-ACK-Codebook-r16 has been configured, then
  Optionally, for a HARQ-ACK codebook related to DL transmission (for example, when a HARQ-ACK codebook type related to DL transmission is determined), the parameter pdsch-HARQ-ACK-Codebook is ignored.
  Optionally, for a HARQ-ACK codebook related to SL transmission (for example, when a HARQ-ACK codebook type related to SL transmission is determined),
    Optionally, the parameter pdsch-HARQ-ACK-Codebook is ignored.
    Optionally, the parameter pdsch-HARQ-ACK-Codebook-r16 is ignored.
    Optionally, the parameter pdsch-HARQ-ACK-Codebook is applied.
    Optionally, the parameter pdsch-HARQ-ACK-Codebook-r16 is applied.
    Optionally, if the parameter pdsch-HARQ-ACK-Codebook has been configured, then the parameter pdsch-HARQ-ACK-Codebook is applied.
    Optionally, if the parameter pdsch-HARQ-ACK-Codebook is not configured, then the parameter pdsch-HARQ-ACK-Codebook-r16 is applied.

Optionally, if the parameter pdsch-HARQ-ACK-Codebook-r16 has been configured, then the parameter PDSCH-HARQ-ACK-CodebookList-r16 is ignored.

Optionally, if the parameter pdsch-HARQ-ACK-CodebookList-r16 has been configured, then the parameter pdsch-HARQ-ACK-Codebook is ignored.

Optionally, if the parameter pdsch-HARQ-ACK-CodebookList-r16 has been configured, then
  Optionally, for a HARQ-ACK codebook related to DL transmission (for example, when a HARQ-ACK codebook type related to DL transmission is determined), the parameter pdsch-HARQ-ACK-Codebook is ignored.
  Optionally, for a HARQ-ACK codebook related to SL transmission (for example, when a HARQ-ACK codebook type related to SL transmission is determined),
    Optionally, the parameter pdsch-HARQ-ACK-Codebook is ignored.
    Optionally, the parameter pdsch-HARQ-ACK-CodebookList-r16 is ignored.
    Optionally, the parameter pdsch-HARQ-ACK-Codebook is applied.
    Optionally, the parameter pdsch-HARQ-ACK-CodebookList-r16 is applied.
    Optionally, if the parameter pdsch-HARQ-ACK-Codebook has been configured, then the parameter pdsch-HARQ-ACK-Codebook is applied.
    Optionally, if the parameter pdsch-HARQ-ACK-Codebook is not configured, then the parameter pdsch-HARQ-ACK-CodebookList-r16 is applied.

Optionally, if the parameter pdsch-HARQ-ACK-CodebookList-r16 has been configured, then the parameter pdsch-HARQ-ACK-Codebook-r16 is ignored.

Optionally, if the parameter pdsch-HARQ-ACK-CodebookList-r16 has been configured, then it is assumed that the parameter pdsch-HARQ-ACK-Codebook-r16 is not to be configured.

Optionally, if the parameter pdsch-HARQ-ACK-Codebook-r16 has been configured, then it is assumed that the parameter pdsch-HARQ-ACK-CodebookList-r16 is not to be configured.

Optionally, if the parameter pdsch-HARQ-ACK-CodebookList-r16 has been configured, and if the parameter pdsch-HARQ-ACK-Codebook-r16 has been configured, then it is considered that the value of each element in the parameter pdsch-HARQ-ACK-CodebookList-r16 is given according to the indication of the parameter pdsch-HARQ-ACK-Codebook-r16. For example, if the length (or the size) of the parameter pdsch-HARQ-ACK-CodebookList-r16 is 2, if the values of the corresponding first and second elements are respectively "semiStatic" and "dynamic", and if the parameter pdsch-HARQ-ACK-Codebook-r16 is configured to be "enhancedDynamic", then it is considered that the values of the first element and the second element of the parameter pdsch-HARQ-ACK-CodebookList-r16 are respectively "enhancedDynamic" and "enhancedDynamic" (that is, the value of each element of the parameter pdsch-HARQ-ACK-CodebookList-r16 is replaced with the value of the parameter pdsch-HARQ-ACK-Codebook-r16).

Optionally, in the case that the context is clear, "pdsch-HARQ-ACK-Codebook" may be used to represent the parameter pdsch-HARQ-ACK-Codebook or the parameter pdsch-HARQ-ACK-Codebook-r16 (whichever one of the two is applicable).

Optionally, in the case that the context is clear, "pdsch-HARQ-ACK-Codebook" may be used to represent any element in the parameter pdsch-HARQ-ACK-CodebookList-r16, or the parameter pdsch-HARQ-ACK-Codebook (whichever one of the two is applicable), wherein
  Optionally, if the parameter pdsch-HARQ-ACK-Codebook is applicable, then it can be considered that one "pdsch-HARQ-ACK-Codebook" is configured, and the "pdsch-HARQ-ACK-Codebook" is used to represent the parameter pdsch-HARQ-ACK-Codebook.
  Optionally, if any element in the parameter pdsch-HARQ-ACK-CodebookList-r16 is applicable, and if the parameter pdsch-HARQ-ACK-CodebookList-r16 includes only one element, then it can be considered that one "pdsch-HARQ-ACK-Codebook" is configured, and the "pdsch-HARQ-ACK-Codebook" is used to represent the element included in the parameter pdsch-HARQ-ACK-CodebookList-r16.

Optionally, if any element in the parameter pdsch-HARQ-ACK-CodebookList-r16 is applicable, and if the parameter pdsch-HARQ-ACK-CodebookList-r16 includes two elements, then it can be considered that two "pdsch-HARQ-ACK-Codebook" are configured, and the two "pdsch-HARQ-ACK-Codebook" are respectively used to represent the two elements included in the parameter pdsch-HARQ-ACK-CodebookList-r16.

Optionally, in the case that the context is clear, "pdsch-HARQ-ACK-Codebook" can be used to represent any element in the parameter pdsch-HARQ-ACK-CodebookList-r16, or the parameter pdsch-HARQ-ACK-Codebook-r16, or the parameter pdsch-HARQ-ACK-Codebook (whichever one of the three is applicable), wherein Optionally, if the parameter pdsch-HARQ-ACK-Codebook is applicable, then it can be considered that one "pdsch-HARQ-ACK-Codebook" is configured, and the "pdsch-HARQ-ACK-Codebook" is used to represent the parameter pdsch-HARQ-ACK-Codebook.

Optionally, if the parameter pdsch-HARQ-ACK-Codebook-r16 is applicable, then it can be considered that one "pdsch-HARQ-ACK-Codebook" is configured, and the "pdsch-HARQ-ACK-Codebook" is used to represent the parameter pdsch-HARQ-ACK-Codebook-r16.

Optionally, if any element in the parameter pdsch-HARQ-ACK-CodebookList-r16 is applicable, and if the parameter pdsch-HARQ-ACK-CodebookList-r16 includes only one element, then it can be considered that one "pdsch-HARQ-ACK-Codebook" is configured, and the "pdsch-HARQ-ACK-Codebook" is used to represent the element included in the parameter pdsch-HARQ-ACK-CodebookList-r16.

Optionally, if any element in the parameter pdsch-HARQ-ACK-CodebookList-r16 is applicable, and if the parameter pdsch-HARQ-ACK-CodebookList-r16 includes two elements, then it can be considered that two "pdsch-HARQ-ACK-Codebook" are configured, and the two "pdsch-HARQ-ACK-Codebook" are respectively used to represent the two elements in the parameter pdsch-HARQ-ACK-CodebookList-r16.

Further, in step S103, the number and/or the type of HARQ-ACK codebooks is determined according to the configuration information related to the HARQ-ACK codebook. For the sake of convenience, if it is determined that the number of HARQ-ACK codebooks is N, then the N HARQ-ACK codebooks may be respectively referred to as the first HARQ-ACK codebook, the second HARQ-ACK codebook, . . . , and the N-th HARQ-ACK codebook.

Optionally, step S103 may be described as "determining, according to the configuration information related to the HARQ-ACK codebook, the number and/or the type of HARQ-ACK codebooks to be generated".

Optionally, N is always equal to 1. In this case, optionally, step S103 may be described as "determining the type of a HARQ-ACK codebook according to the configuration information related to the HARQ-ACK codebook", or "determining the type of the first HARQ-ACK codebook according to the configuration information related to the HARQ-ACK codebook", or "determining the type of a HARQ-ACK codebook to be generated according to the configuration information related to the HARQ-ACK codebook", or "determining the type of the first HARQ-ACK codebook to be generated according to the configuration information related to the HARQ-ACK codebook".

Optionally, N satisfies N≥1. In this case, optionally, each HARQ-ACK codebook may have respective configuration information. In this case, the type of the first HARQ-ACK codebook is determined according to the configuration information related to the first HARQ-ACK codebook, the type of the second HARQ-ACK codebook is determined according to the configuration information related to the second HARQ-ACK codebook, . . . , and the type of the N-th HARQ-ACK codebook is determined according to the configuration information related to the N-th HARQ-ACK codebook. The method for determining the type of each HARQ-ACK codebook other than the first HARQ-ACK codebook according to the corresponding configuration information may be the same as the method for determining the type of the first HARQ-ACK codebook.

Optionally, if a first type of condition is satisfied, it is determined that the type of the first HARQ-ACK codebook is "type-1", wherein Optionally, the first type of condition may be one or more of the following in any combination of "and" or "or" (where applicable):

The parameter pdsch-HARQ-ACK-Codebook is not configured.

The parameter pdsch-HARQ-ACK-Codebook has been configured to be "semiStatic".

The parameter pdsch-HARQ-ACK-Codebook has been configured, and is not configure to be "dynamic".

The parameter pdsch-HARQ-ACK-Codebook has been configured, and is not configure to be "enhancedDynamic".

The parameter pdsch-HARQ-ACK-Codebook is not ignored.

The parameter pdsch-HARQ-ACK-Codebook has been ignored.

The parameter pdsch-HARQ-ACK-Codebook-r16 is not configured.

The parameter pdsch-HARQ-ACK-Codebook-r16 has been configured to be "semiStatic".

The parameter pdsch-HARQ-ACK-Codebook-r16 has been configured, and is not configure to be "dynamic".

The parameter pdsch-HARQ-ACK-Codebook-r16 has been configured, and is not configure to be "enhancedDynamic".

The parameter pdsch-HARQ-ACK-Codebook-r16 is not ignored.

The parameter pdsch-HARQ-ACK-Codebook-r16 has been ignored.

The parameter pdsch-HARQ-ACK-CodebookList-r16 is not configured.

The parameter pdsch-HARQ-ACK-CodebookList-r16 has been configured to be a sequence having the size of 1.

The parameter pdsch-HARQ-ACK-CodebookList-r16 has been configured to be a sequence having the size of 2.

The parameter pdsch-HARQ-ACK-CodebookList-r16 has been configured, and the first element thereof has been configured to be "semiStatic".

The parameter pdsch-HARQ-ACK-CodebookList-r16 has been configured, and the first element thereof is not configured to be "dynamic".

The parameter pdsch-HARQ-ACK-CodebookList-r16 has been configured, and the first element thereof is not configured to be "enhancedDynamic".

The parameter pdsch-HARQ-ACK-CodebookList-r16 has been configured, and the last element thereof has been configured to be "semiStatic".

The parameter pdsch-HARQ-ACK-CodebookList-r16 has been configured, and the last element thereof is not configured to be "dynamic".

The parameter pdsch-HARQ-ACK-CodebookList-r16 has been configured, and the last element thereof is not configured to be "enhancedDynamic".

The parameter pdsch-HARQ-ACK-CodebookList-r16 has been configured, and all elements thereof have been configured to be "semiStatic".

The parameter pdsch-HARQ-ACK-CodebookList-r16 has been configured, and none of elements thereof is configured to be "dynamic".

The parameter pdsch-HARQ-ACK-CodebookList-r16 has been configured, and none of elements thereof is configured to be "enhancedDynamic".

The parameter pdsch-HARQ-ACK-CodebookList-r16 has been configured, and at least one element thereof has been configured to be "semiStatic".

The parameter pdsch-HARQ-ACK-CodebookList-r16 has been configured, and at least one element thereof is not configured to be "dynamic".

The parameter pdsch-HARQ-ACK-CodebookList-r16 has been configured, and at least one element thereof is not configured to be "enhancedDynamic".

Optionally, the first type of condition may be any one of the following:

The value of the parameter pdsch-HARQ-ACK-Codebook or the parameter pdsch-HARQ-ACK-CodebookList-r16 (whichever one of the two is applicable) is configured to be only "semiStatic".

No value of the parameter pdsch-HARQ-ACK-Codebook or the parameter pdsch-HARQ-ACK-CodebookList-r16 (whichever one of the two is applicable) is configured to be "dynamic".

No value of the parameter pdsch-HARQ-ACK-Codebook or the parameter pdsch-HARQ-ACK-CodebookList-r16 (whichever one of the two is applicable) is configured to be "enhancedDynamic".

No value of the parameter pdsch-HARQ-ACK-Codebook or the parameter pdsch-HARQ-ACK-CodebookList-r16 (whichever one of the two is applicable) is configured to be "dynamic" or "enhancedDynamic".

At least one value of the parameter pdsch-HARQ-ACK-Codebook or the parameter pdsch-HARQ-ACK-CodebookList-r16 (whichever one of the two is applicable) is configured to be "semiStatic".

At least one value of the parameter pdsch-HARQ-ACK-Codebook or the parameter pdsch-HARQ-ACK-CodebookList-r16 (whichever one of the two is applicable) is not configured to be "dynamic".

At least one value of the parameter pdsch-HARQ-ACK-Codebook or the parameter pdsch-HARQ-ACK-CodebookList-r16 (whichever one of the two is applicable) is not configured to be "enhancedDynamic".

The value of "pdsch-HARQ-ACK-Codebook" or the parameter pdsch-HARQ-ACK-CodebookList-r16 (whichever one of the two is applicable) is configured to be only "semiStatic".

No value of "pdsch-HARQ-ACK-Codebook" or the parameter pdsch-HARQ-ACK-CodebookList-r16 (whichever one of the two is applicable) is configured to be "dynamic".

No value of "pdsch-HARQ-ACK-Codebook" or the parameter pdsch-HARQ-ACK-CodebookList-r16 (whichever one of the two is applicable) is configured to be "enhancedDynamic".

No value of "pdsch-HARQ-ACK-Codebook" or the parameter pdsch-HARQ-ACK-CodebookList-r16 (whichever one of the two is applicable) is configured to be "dynamic" or "enhancedDynamic".

At least one value of "pdsch-HARQ-ACK-Codebook" or the parameter pdsch-HARQ-ACK-CodebookList-r16 (whichever one of the two is applicable) is configured to be "semiStatic".

At least one value of "pdsch-HARQ-ACK-Codebook" or the parameter pdsch-HARQ-ACK-CodebookList-r16 (whichever one of the two is applicable) is not configured to be "dynamic".

At least one value of "pdsch-HARQ-ACK-Codebook" or the parameter pdsch-HARQ-ACK-CodebookList-r16 (whichever one of the two is applicable) is not configured to be "enhancedDynamic".

At least one value of "pdsch-HARQ-ACK-Codebook" or the parameter pdsch-HARQ-ACK-CodebookList-r16 (whichever one of the two is applicable) is not configured to be "dynamic" or "enhancedDynamic".

The value of the parameter pdsch-HARQ-ACK-Codebook or the parameter pdsch-HARQ-ACK-Codebook-r6 or the parameter pdsch-HARQ-ACK-CodebookList-r16 (whichever one of the three is applicable) is configured to be only "semiStatic".

No value of the parameter pdsch-HARQ-ACK-Codebook or the parameter pdsch-HARQ-ACK-Codebook-r6 or the parameter pdsch-HARQ-ACK-CodebookList-r16 (whichever one of the three is applicable) is configured to be "dynamic".

No value of the parameter pdsch-HARQ-ACK-Codebook or the parameter pdsch-HARQ-ACK-Codebook-r6 or the parameter pdsch-HARQ-ACK-CodebookList-r16 (whichever one of the three is applicable) is configured to be "enhancedDynamic".

No value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be "dynamic" or "enhancedDynamic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be "semiStatic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is not configured to be "dynamic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is not configured to be "enhancedDynamic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is not configured to be "dynamic" or "enhancedDynamic".

For each configured HARQ-ACK codebook, all values of corresponding "pdsch-HARQ-ACK-Codebook" are configured to be "semiStatic".

For each configured HARQ-ACK codebook, none of the values of corresponding "pdsch-HARQ-ACK-Codebook" is configured to be "dynamic".

For each configured HARQ-ACK codebook, none of the values of corresponding "pdsch-HARQ-ACK-Codebook" is configured to be "enhancedDynamic".

For each configured HARQ-ACK codebook, none of the values of corresponding "pdsch-HARQ-ACK-Codebook" is configured to be "dynamic" or "enhancedDynamic".

For at least one configured HARQ-ACK codebook, the value of corresponding "pdsch-HARQ-ACK-Codebook" is configured to be "semiStatic".

For at least one configured HARQ-ACK codebook, the value of corresponding "pdsch-HARQ-ACK-Codebook" is not configured to be "dynamic".

For at least one configured HARQ-ACK codebook, the value of corresponding "pdsch-HARQ-ACK-Codebook" is not configured to be "enhancedDynamic".

For at least one configured HARQ-ACK codebook, the value of corresponding "pdsch-HARQ-ACK-Codebook" is not configured to be "dynamic" or "enhancedDynamic".

The value of each configured "pdsch-HARQ-ACK-Codebook" is "semiStatic".

No value of each configured "pdsch-HARQ-ACK-Codebook" is "dynamic".

No value of each configured "pdsch-HARQ-ACK-Codebook" is "enhancedDynamic".

No value of each configured "pdsch-HARQ-ACK-Codebook" is "dynamic" or "enhancedDynamic".

The value of at least one configured "pdsch-HARQ-ACK-Codebook" is "semiStatic".

The value of at least one configured "pdsch-HARQ-ACK-Codebook" is not "dynamic".

The value of at least one configured "pdsch-HARQ-ACK-Codebook" is not "enhancedDynamic".

The value of at least one configured "pdsch-HARQ-ACK-Codebook" is not "dynamic" or "enhancedDynamic".

Optionally, if a second type of condition is satisfied, it is determined that the type of the first HARQ-ACK codebook is "type-2", wherein Optionally, the second type of condition may be one or more of the following in any combination of "and" or "or" (where applicable):

The parameter pdsch-HARQ-ACK-Codebook is not configured.

The parameter pdsch-HARQ-ACK-Codebook has been configured, and is not configured to be "semiStatic".

The parameter pdsch-HARQ-ACK-Codebook has been configured to be "dynamic".

The parameter pdsch-HARQ-ACK-Codebook has been configured to be "enhancedDynamic".

The parameter pdsch-HARQ-ACK-Codebook is not ignored.

The parameter pdsch-HARQ-ACK-Codebook has been ignored.

The parameter pdsch-HARQ-ACK-Codebook-r16 is not configured.

The parameter pdsch-HARQ-ACK-Codebook-r16 has been configured, and is not configured to be "semiStatic".

The parameter pdsch-HARQ-ACK-Codebook-r16 has been configured to be "dynamic".

The parameter pdsch-HARQ-ACK-Codebook-r16 has been configured to be "enhancedDynamic".

The parameter pdsch-HARQ-ACK-Codebook-r16 is not ignored.

The parameter pdsch-HARQ-ACK-Codebook-r16 has been ignored.

The parameter pdsch-HARQ-ACK-CodebookList-r16 is not configured.

The parameter pdsch-HARQ-ACK-CodebookList-r16 has been configured to be a sequence having the size of 1.

The parameter pdsch-HARQ-ACK-CodebookList-r16 has been configured to be a sequence having the size of 2.

The parameter pdsch-HARQ-ACK-CodebookList-r16 has been configured, and the first element thereof is not configured to be "semiStatic".

The parameter pdsch-HARQ-ACK-CodebookList-r16 has been configured, and the first element thereof has been configured to be "dynamic".

The parameter pdsch-HARQ-ACK-CodebookList-r16 has been configured, and the first element thereof has been configured to be "enhancedDynamic".

The parameter pdsch-HARQ-ACK-CodebookList-r16 has been configured, and the last element thereof is not configured to be "semiStatic".

The parameter pdsch-HARQ-ACK-CodebookList-r16 has been configured, and the last element thereof has been configured to be "dynamic".

The parameter pdsch-HARQ-ACK-CodebookList-r16 has been configured, and the last element thereof has been configured to be "enhancedDynamic".

The parameter pdsch-HARQ-ACK-CodebookList-r16 has been configured, and none of elements thereof is configured to be "semiStatic".

The parameter pdsch-HARQ-ACK-CodebookList-r16 has been configured, and all elements thereof have been configured to be "dynamic".

The parameter pdsch-HARQ-ACK-CodebookList-r16 has been configured, and all elements thereof have been configured to be "enhancedDynamic".

The parameter pdsch-HARQ-ACK-CodebookList-r16 has been configured, and all elements thereof have been configured to be "dynamic" or "enhancedDynamic".

The parameter pdsch-HARQ-ACK-CodebookList-r16 has been configured, and at least one element thereof is not configured to be "semiStatic".

The parameter pdsch-HARQ-ACK-CodebookList-r16 has been configured, and at least one element thereof has been configured to be "dynamic".

The parameter pdsch-HARQ-ACK-CodebookList-r16 has been configured, and at least one element thereof has been configured to be "enhancedDynamic".

Optionally, the second type of condition may be any one of the following:

No value of the parameter pdsch-HARQ-ACK-Codebook or the parameter pdsch-HARQ-ACK-CodebookList-r16 (whichever one of the two is applicable) is configured to be "semiStatic".

The value of the parameter pdsch-HARQ-ACK-Codebook or the parameter pdsch-HARQ-ACK-CodebookList-r16 (whichever one of the two is applicable) is configured to be only "dynamic".

The value of the parameter pdsch-HARQ-ACK-Codebook or the parameter pdsch-HARQ-ACK-CodebookList-r16 (whichever one of the two is applicable) is configured to be only "enhancedDynamic".

The value of the parameter pdsch-HARQ-ACK-Codebook or the parameter pdsch-HARQ-ACK-CodebookList-r16 (whichever one of the two is applicable) is configured to be only "dynamic" and "enhancedDynamic".

At least one value of the parameter pdsch-HARQ-ACK-Codebook or the parameter pdsch-HARQ-ACK-CodebookList-r16 (whichever one of the two is applicable) is not configured to be "semiStatic".

At least one value of the parameter pdsch-HARQ-ACK-Codebook or the parameter pdsch-HARQ-ACK-CodebookList-r16 (whichever one of the two is applicable) is configured to be "dynamic".

At least one value of the parameter pdsch-HARQ-ACK-Codebook or the parameter pdsch-HARQ-ACK-CodebookList-r16 (whichever one of the two is applicable) is configured to be "enhancedDynamic".

At least one value of the parameter pdsch-HARQ-ACK-Codebook or the parameter pdsch-HARQ-ACK-CodebookList-r16 (whichever one of the two is applicable) is configured to be "dynamic" or "enhancedDynamic".

No value of "pdsch-HARQ-ACK-Codebook" or the parameter pdsch-HARQ-ACK-CodebookList-r16 (whichever one of the two is applicable) is configured to be "semiStatic".

The value of "pdsch-HARQ-ACK-Codebook" or the parameter pdsch-HARQ-ACK-CodebookList-r16 (whichever one of the two is applicable) is configured to be only "dynamic".

The value of "pdsch-HARQ-ACK-Codebook" or the parameter pdsch-HARQ-ACK-CodebookList-r16 (whichever one of the two is applicable) is configured to be only "enhancedDynamic".

The value of "pdsch-HARQ-ACK-Codebook" or the parameter pdsch-HARQ-ACK-CodebookList-r16 (whichever one of the two is applicable) is configured to be only "dynamic" or "enhancedDynamic".

The value of "pdsch-HARQ-ACK-Codebook" or the parameter pdsch-HARQ-ACK-CodebookList-r16 (whichever one of the two is applicable) is configured to be only "dynamic" and "enhancedDynamic".

At least one value of "pdsch-HARQ-ACK-Codebook" or the parameter pdsch-HARQ-ACK-CodebookList-r16 (whichever one of the two is applicable) is not configured to be "semiStatic".

At least one value of "pdsch-HARQ-ACK-Codebook" or the parameter pdsch-HARQ-ACK-CodebookList-r16 (whichever one of the two is applicable) is configured to be "dynamic".

At least one value of "pdsch-HARQ-ACK-Codebook" or the parameter pdsch-HARQ-ACK-CodebookList-r16 (whichever one of the two is applicable) is configured to be "enhancedDynamic".

At least one value of "pdsch-HARQ-ACK-Codebook" or the parameter pdsch-HARQ-ACK-CodebookList-r16 (whichever one of the two is applicable) is configured to be "dynamic" or "enhancedDynamic".

No value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be "semiStatic".

The value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be only "dynamic".

The value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be only "enhancedDynamic".

The value of the parameter pdsch-HARQ-ACK-Codebook or the parameter pdsch-HARQ-ACK-Codebook-r6 or the parameter pdsch-HARQ-ACK-CodebookList-r16 (whichever one of the three is applicable) is configured to be only "dynamic" or "enhancedDynamic".

The value of the parameter pdsch-HARQ-ACK-Codebook or the parameter pdsch-HARQ-ACK-Codebook-r6 or the parameter pdsch-HARQ-ACK-CodebookList-r16 (whichever one of the three is applicable) is configured to be only "dynamic" and "enhancedDynamic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is not configured to be "semiStatic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be "dynamic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be "enhancedDynamic".

At least one value of the parameter pdsch-HARQ-ACK-Codebook or the parameter pdsch-HARQ-ACK-Codebook-r16 or the parameter pdsch-HARQ-ACK-CodebookList-r16 (whichever one of the three is applicable) is configured to be "dynamic" or "enhancedDynamic".

For each configured HARQ-ACK codebook, none of the values of corresponding "pdsch-HARQ-ACK-Codebook" is configured to be "semiStatic".

For each configured HARQ-ACK codebook, all values of corresponding "pdsch-HARQ-ACK-Codebook" are configured to be "dynamic".

For each configured HARQ-ACK codebook, all values of corresponding "pdsch-HARQ-ACK-Codebook" are configured to be "enhancedDynamic".

For each configured HARQ-ACK codebook, all values of corresponding "pdsch-HARQ-ACK-Codebook" are configured to be "dynamic" or "enhancedDynamic".

For at least one configured HARQ-ACK codebook, the value of corresponding "pdsch-HARQ-ACK-Codebook" is not configured to be "semiStatic".

For at least one configured HARQ-ACK codebook, the value of corresponding "pdsch-HARQ-ACK-Codebook" is configured to be "dynamic".

For at least one configured HARQ-ACK codebook, the value of corresponding "pdsch-HARQ-ACK-Codebook" is configured to be "enhancedDynamic".

For at least one configured HARQ-ACK codebook, the value of corresponding "pdsch-HARQ-ACK-Codebook" is configured to be "dynamic" or "enhancedDynamic".

The value of each configured "pdsch-HARQ-ACK-Codebook" is not "semiStatic".

The value of each configured "pdsch-HARQ-ACK-Codebook" is "dynamic".

The value of each configured "pdsch-HARQ-ACK-Codebook" is "enhancedDynamic".

The value of each configured "pdsch-HARQ-ACK-Codebook" is "dynamic" or "enhancedDynamic".

The value of at least one configured "pdsch-HARQ-ACK-Codebook" is not "semiStatic".

The value of at least one configured "pdsch-HARQ-ACK-Codebook" is "dynamic".

The value of at least one configured "pdsch-HARQ-ACK-Codebook" is "enhancedDynamic".

The value of at least one configured "pdsch-HARQ-ACK-Codebook" is "dynamic" or "enhancedDynamic".

Optionally, in Embodiment 1 of the present invention, the PSSCH may be dynamically scheduled (for example, scheduled by means of SCI).

Optionally, in Embodiment 1 of the present invention, the PSSCH may be non-dynamically scheduled (for example, scheduled by means of a sidelink configured grant).

Optionally, in Embodiment 1 of the present invention, if the first type of condition is not satisfied, then it is determined that the type of the first HARQ-ACK codebook is "type-2".

Optionally, in Embodiment 1 of the present invention, if the second type of condition is not satisfied, then it is determined that the type of the first HARQ-ACK codebook is "type-1".

Optionally, in Embodiment 1 of the present invention, "semiStatic" may be replaced with "semi-static".

Optionally, in Embodiment 1 of the present invention, "enhancedDynamic" may be replaced with "enhancedDynamic-r16".

Optionally, in Embodiment 1 of the present invention, "whichever one of the two is applicable" may mean that when only one of the two has been configured, it is determined that the one that has been configured is the one that is applicable, and when both of the two have been configured, one of the two is ignored, and it is determined that the one that is not ignored is the one that is applicable.

Optionally, in Embodiment 1 of the present invention, "whichever one of the three is applicable" may mean that when only one of the three has been configured, it is determined that the one that has been configured is the one that is applicable; when two of the three have been configured, one of the two that have been configured is ignored, and it is determined that the other one of the two that is not ignored is the one that is applicable; when all of the three have been configured, two of the three are ignored, and it is determined that the one that is not ignored is the one that is applicable.

Optionally, in Embodiment 1 of the present invention, a parameter (or a quantity or a variable) (e.g., denoted as X) may be configured with one or more values.

For example, X may be a parameter (or a quantity or a variable) of a type such as an integer, or a decimal, or a string, or the like, and may be correspondingly configured with one value of a type such as an integer, or a decimal, or a string, or the like. For example, the parameter pdsch-HARQ-ACK-Codebook defined below may be configured with one value, and the value is equal to semiStatic or dynamic.

pdsch-HARQ-ACK-Codebook    ENUMERATED {semiStatic, dynamic}

As another example, X may be a list or a set of a type such as an integer, or a decimal, or a string, or the like having the size of $N_x$ ($N_x \geq 1$), wherein each element of the list or set may be configured with a value of a type such as an integer, or a decimal, or a string, or the like, and correspondingly, X may be configured with $N_x$ values, wherein optionally "the value of X is configured to be only v" means that the $N_X$ values are all equal to v.

Optionally "no value of X is configured to be v" means that none of the $N_X$ values is equal to v.

Optionally "at least one value of X is configured to be v" means that at least one of the $N_X$ values is equal to v.

Optionally "at least one value of X is not configured to be v" means that at least one of the $N_X$ values is not equal to v.

Optionally "at least one value of X is not configured to be $v_1$ or $v_2$" means that at least one of the $N_X$ values is not equal to $v_1$ or $v_2$.

Optionally, "at least one value of X is configured to be $v_1$ or $v_2$" means that at least one of the $N_X$ values is equal to $v_1$ or $v_2$.

Optionally, "the value of X is configured to be only $v_1$ and $v_2$" means that any one of the $N_X$ values is equal to $v_1$ or $v_2$.

Optionally, "the value of X is configured to be $v_1$ and $v_2$" means that any one of the $N_X$ values is equal to $v_1$ or $v_2$.

Optionally, "the value of X is not configured to be $v_1$ or $v_2$" means that none of the $N_X$ values is equal to $v_1$ or $v_2$.

For example, the parameter pdsch-HARQ-ACK-CodebookList-r16 defined below may be configured with one value ($N_x=1$) or two values ($N_x=2$), and each value thereof may be equal to semiStatic or dynamic.

pdsch-HARQ-ACK-CodebookList-r16    SetupRelease
{PDSCH-HARQ-ACK-CodebookList-r16} OPTIONAL, -- Need M
PDSCH-HARQ-ACK-CodebookList-r16    ::=    SEQUENCE (SIZE (1..2)) OF
ENUMERATED {semiStatic, dynamic}

Therefore, according to Embodiment 1, provided in the present invention is a method, which determines a HARQ-ACK codebook related to SL transmission appropriately according to configuration information related to the HARQ-ACK codebook, so that the same set of parameters related to HARQ-ACK codebooks can be used to determine both a HARQ-ACK codebook related to DL transmission and a HARQ-ACK codebook related to SL transmission, thereby improving the efficiency of system parameter configuration.

Variant Embodiment

Figure 2:
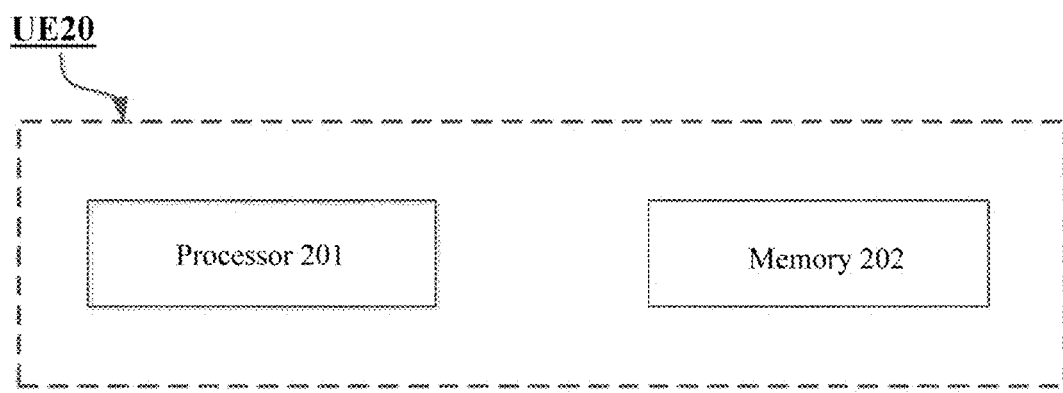
FIG. 2 shows a block diagram of user equipment (UE) according to the present invention.

Hereinafter, FIG. 2 is used to illustrate user equipment that can perform the method performed by user equipment described in detail above in the present invention as a variant embodiment.

FIG. 2 is a block diagram showing user equipment (UE) according to the present invention.

As shown in FIG. 2, user equipment (UE) 20 includes a processor 201 and a memory 202. The processor 201 may include, for example, a microprocessor, a microcontroller, an embedded processor, and the like. The memory 202 may include, for example, a volatile memory (such as a random access memory (RAM)), a hard disk drive (HDD), a non-volatile memory (such as a flash memory), or other memories. The memory 202 stores program instructions. The instructions, when run by the processor 201, can perform the above method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an AMF, a UPF, an MME, an S-GW, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments. Those skilled in the art should understand that part of or all of the mathematical expressions, mathematical equations, or mathematical inequalities may be simplified or transformed or rewritten to some extent, for example, incorporating constant terms, or interchanging two addition terms, or interchanging two multiplication terms, or moving a term from the left side of an equation or inequality to the right side after changing the plus or minus sign thereof, or moving a term from the right side of an equation or inequality to the left side after changing the plus or minus sign thereof or the like. Mathematical expressions, mathematical equations, or mathematical inequalities before and after the simplification or transformation or rewriting may be considered to be equivalent to each other.

It should be understood that the above-described embodiments of the present invention may be implemented by software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In the present invention, the term "base station" may refer to a mobile communication data and/or control switching center having specific transmission power and a specific coverage area and including functions such as resource allocation and scheduling, data reception and transmission, and the like. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method performed by user equipment, comprising following steps:
receiving configuration information of a first RRC parameter and a second RRC parameter, wherein, the first RRC parameter is pdsch-HARQ-ACK-Codebook parameter whose value is an element in a set {semiStatic, dynamic}; and the second RRC parameter is pdsch-HARQ-ACK-Codebook-r16 parameter whose value is an element in a set {enhancedDynamic}; and determining each of a first HARQ-ACK codebook type for HARQ-ACK information for downlink and a second HARQ-ACK codebook type for HARQ-ACK information for sidelink, based on either the first RRC parameter or the second RRC parameter, wherein, for the first HARQ-ACK codebook type, the user equipment ignores the first RRC parameter; and for the second HARQ-ACK codebook type, the user equipment ignores the second RRC parameter and applies the first RRC parameter.

2. A user equipment, comprising:

a processor; and a memory storing instructions, wherein the instructions, when run by the processor, cause the user equipment to perform following steps:

receiving configuration information of a first RRC parameter and a second RRC parameter, wherein, the first RRC parameter is pdsch-HARQ-ACK-Codebook parameter whose value is an element in a set {semiStatic, dynamic}; and the second RRC parameter is pdsch-HARQ-ACK-Codebook-r16 parameter whose value is an element in a set {enhancedDynamic}; and determining each of a first HARQ-ACK codebook type for HARQ-ACK information for downlink and a second HARQ-ACK codebook type for HARQ-ACK information for sidelink, based on either the first RRC parameter or the second RRC parameter, wherein, for the first HARQ-ACK codebook type, the user equipment ignores the first RRC parameter; and for the second HARQ-ACK codebook type, the user equipment ignores the second RRC parameter and applies the first RRC parameter.

3. A base station, comprising:

a processor; and a memory storing instructions, wherein the instructions, when run by the processor, cause the base station to perform following steps:

transmitting configuration information of a first RRC parameter and a second RRC parameter, wherein, the first RRC parameter is pdsch-HARQ-ACK-Codebook parameter whose value is an element in a set {semiStatic, dynamic}; and the second RRC parameter is pdsch-HARQ-ACK-Codebook-r16 parameter whose value is an element in a set {enhancedDynamic}; wherein the configuration information causes a user equipment to determine each of a first HARQ-ACK codebook type for HARQ-ACK information for downlink and a second HARQ-ACK codebook type for HARQ-ACK information for sidelink, based on either the first RRC parameter or the second RRC parameter, wherein, for the first HARQ-ACK codebook type, the first RRC parameter is ignored; and for the second HARQ-ACK codebook type, the second RRC parameter is ignored and the first RRC parameter is applied.

* * * * *